(12) United States Patent
Chen

(10) Patent No.: US 6,952,090 B2
(45) Date of Patent: Oct. 4, 2005

(54) WHEEL HAVING AN ACCELERATING CHARGER

(75) Inventor: Ting-Hsing Chen, Tainan Hsien (TW)

(73) Assignee: Far Great Plastics Industrial Co., Ltd., Tainan Hsien (TW)

( * ) Notice: Subject to any disclaimer, the term of this patent is extended or adjusted under 35 U.S.C. 154(b) by 136 days.

(21) Appl. No.: 10/722,506

(22) Filed: Nov. 28, 2003

(65) Prior Publication Data

US 2005/0116681 A1 Jun. 2, 2005

(51) Int. Cl.⁷ .............................................. H01M 10/46

(52) U.S. Cl. ...................................... 320/101

(58) Field of Search ................................ 320/101, 107, 320/114, 115; 10/65.1, 65.2, 65.3, 65.4, 65.6, 10/65.7

(56) References Cited

U.S. PATENT DOCUMENTS

| | | | | |
|---|---|---|---|---|
| 4,825,971 A | * | 5/1989 | Bernstein | 180/65.1 |
| 5,749,429 A | * | 5/1998 | Yamauchi et al. | 180/65.2 |
| 5,881,559 A | * | 3/1999 | Kawamura | 180/65.4 |

* cited by examiner

*Primary Examiner*—Edward H. Tso
(74) *Attorney, Agent, or Firm*—Rosenberg, Klein & Lee

(57) ABSTRACT

A wheel having an accelerating charger includes a wheel body, a generator unit, an accelerating gear set, and a shaft. The generator unit and the accelerating gear set are coupled in the wheel body by a shaft. The generator unit includes a magnet and a coil. The accelerating gear set has a solar gear, a pair of planetary gears, a gear plate, and a driven gear. The solar gear and the coil are first coupled to the wheel body in such an arrangement that they spin in the same direction with the wheel body whereas the planetary gears are linked by the solar gear to rotate and the driven gear is also linked to rotate in an opposite direction. The magnet coupled on the driven gear rotates with the driven gear at the same time.

2 Claims, 3 Drawing Sheets

WHEEL HAVING AN ACCELERATING CHARGER

FIELD OF THE INVENTION

This invention relates to an accelerating charger for a wheel, and more particularly to a wheel having an accelerating gear set to accelerate the rotation of a magnet in a generator unit, and the generator unit having a magnet and a coil rotating in opposing directions to accelerate charging efficiency.

BACKGROUND OF THE INVENTION

In order to attract the youngster's attention, inventors have designed many products in their market, such as scooters, tricycles, baby strollers, toy cars, roller skates, skateboards, shopping carts, bicycles ... etc., many of which comprise illumination devices. However, the illumination devices require electric power to work. Most of the power uses the wheel rotation to generate power. When the wheel rotates, electric power is generated to activate the illumination devices. If the wheel rolls slow, the electric power is week and the illuminating effect is affected.

SUMMARY OF THE INVENTION

It is the primary object of the present invention to provide a wheel having an accelerating charger, which requires little rotation of the wheel and still generates enough power to activate illumination devices.

It is another object of the present invention to provide a wheel having an accelerating charger, which is easy to operate without any complicated operation.

DETAILED DESCRIPTION OF THE PREFERRED EMBODIMENT

Figure 1:
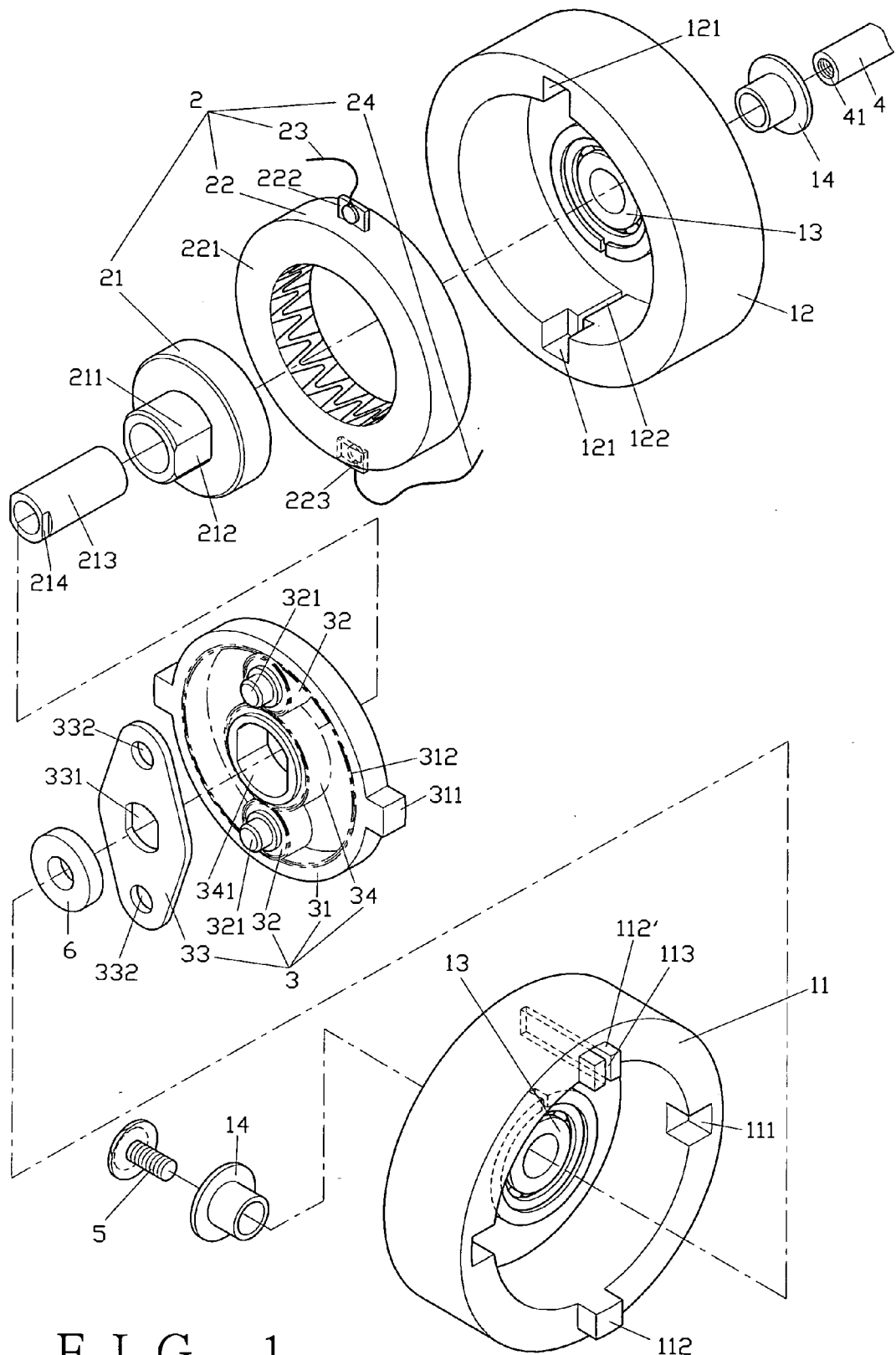
FIG. 1 is an exploded view of the present invention.
Figure 2:
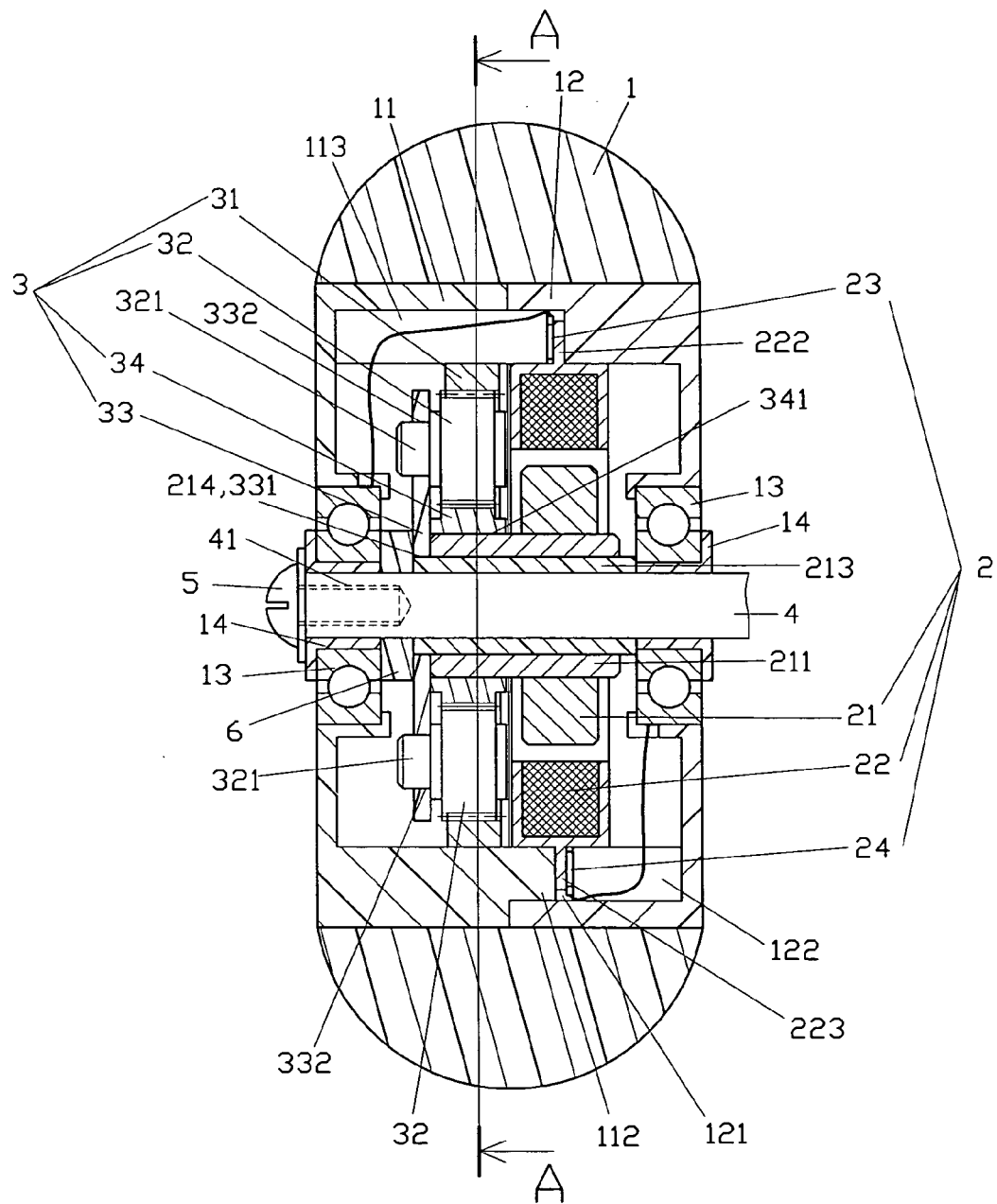
FIG. 2 is a side cross sectional view of the present invention.

As shown in FIGS. 1 and 2, the present invention comprises a wheel body 1, a generator unit 2, an accelerating gear set 3 and a shaft 4.

The wheel body 1 includes a pair of wheel rims 11 and 12. Each of the wheel rims 11 and 12 has a pair of grooves 111 and 121 at the inner side. The wheel rim 11 protrudes a pair of blocks 112 and 112' corresponding in position to the grooves 121 of the wheel rim 12. The block 112' has a slot 113 thereof. One of the grooves 121 also has a slot 122 thereof. Each of the wheel rims 11 and 12 comprises a bearing 13 at the center and a sleeve 14 thereon.

The generator unit 2 comprises a magnet 21 and a coil 22. The magnet 21 is integrally formed with a shaft sleeve 211. The shaft sleeve 211 has a pair of flat surfaces 212 at respective sides. The inner wall of the shaft sleeve 211 is inserted with an insulating tube 213. The end of the insulating tube 213 further comprises a pair of cut-off surfaces 214 thereat. The coil 22 comprises a cover 221 with a pair of wires 23 and 24. Both the wires 23 and 24 are connected to a pair of bosses 222 and 223 representing a positive pole and a negative pole to transfer electric power therefrom.

The accelerating gear set 3 comprising a solar gear 31, a pair of planetary gears 32, a gear plate 33, and a driven gear 34. The solar gear 31 comprises a pair of lugs 311 on respective sides and an inner gear 312 around the inner wall thereof. Each planetary gear 32 meshes with the inner gear 312 of the solar gear 31 with a stud 321 protruding from the center for the gear plate 33 to fix thereon. The gear plate 33 comprises a rectangle-like hole 331 at the center and a pair of through holes 332 on respective ends. The driven gear 34 is placed between the two planetary gears 32 and meshes with the planetary gears 32. The driven gear 34 comprises a rectangle-like hole 341 at the center thereof.

The shaft 4 is a conducting metal rod inserted through the wheel body 1. The shaft 4 has a threaded hole 41 at the end for a bolt 5 to insert and secure therein.

Figure 3:
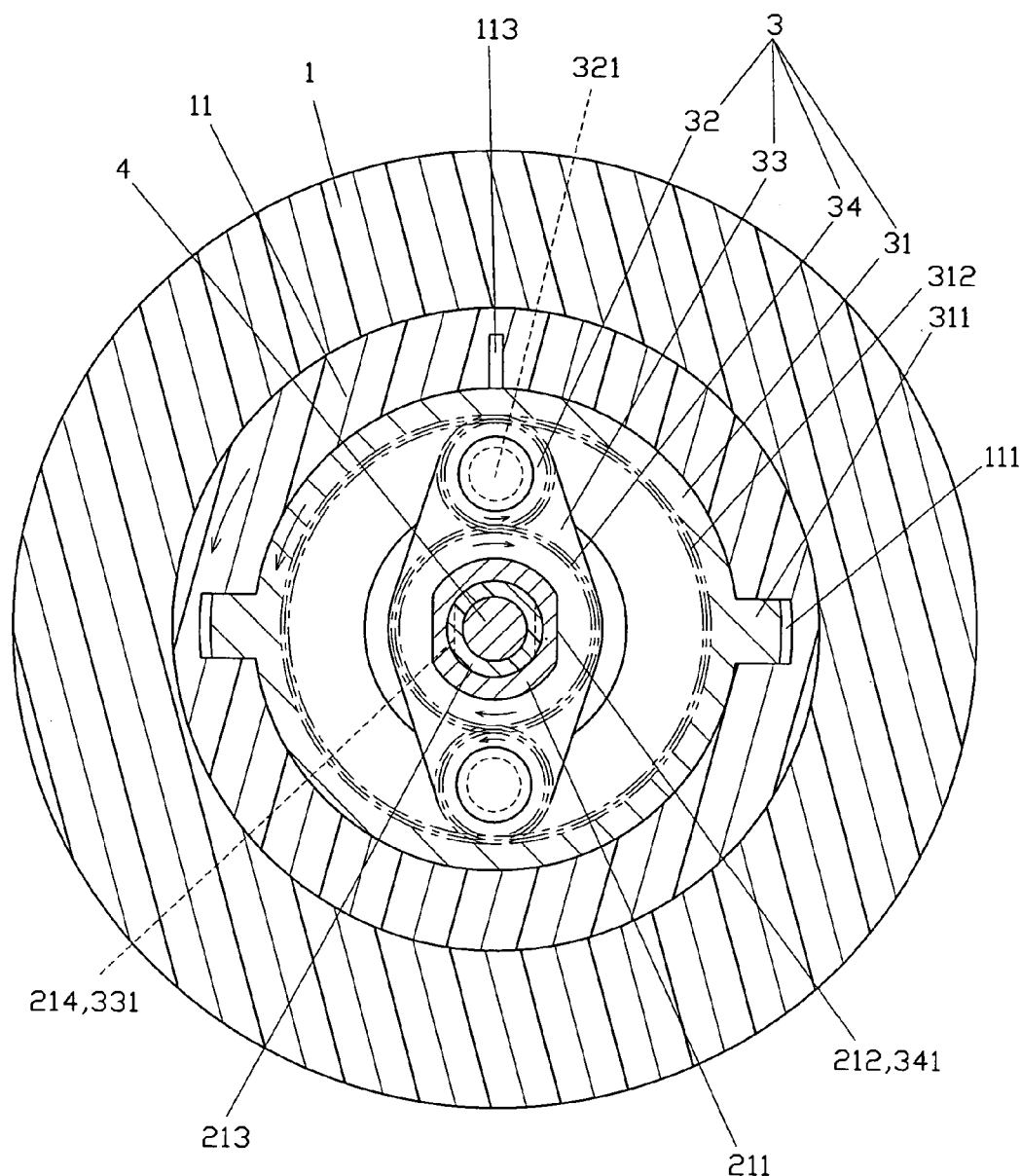
FIG. 3 is a cross sectional view, taken along line A—A of FIG. 2.

FIGS. 2 and 3 show an assembly of the present invention. The gear plate 33 is placed onto the accelerating gear set 3 with the studs 321 of the planetary gears 32 inserting into the two through holes 332. The driven gear 34 is placed between the planetary gears 32 and meshes with the planetary gears 32 to form a linking status. The accelerating gear set 3 is placed into the wheel rim 11. A conductive washer 6 is applied and placed between the gear plate 33 and the bearing 13 of the wheel rim 11 to secure the gear plate 33 in place. The two lugs 311 of the solar gear 31 are slid into the two grooves 111 of the wheel rim 11. This secures the accelerating gear set 3. The two planetary gears 32 are designed to mesh with the inner gear 312 of the solar gear 31. The shaft sleeve 211 is inserted through the hole 341 of the driven gear 34 with the flat surfaces 212 fitted into the same shape of the hole 341 to secure the shaft sleeve 211 in place, thus the magnet 21 is linked with the driven gear 34. The cut-off surfaces 214 of the insulting tube 213 engage with the hole 331 of the gear plate 33 to prevent the gear plate 33 from loosening.

The bosses 222 and 223 of the coil 22 engage with the grooves 121 of the wheel rim 12. The wires 23 and 24 extending from the two bosses 222 and 223 are led through the slot 113 of the block 112' and the slot 122 of the groove 121, respectively. The two wheel rims 11 and 12 are coupled together with the blocks 112 and 112' of the wheel rim 11 sliding into the grooves 121 of the wheel rim 12. This insertion also holds the wires 23 and 24 of the coil 22 in place. The magnet 21 on the shaft sleeve 211 is located in the coil 22. The shaft 4 is inserted through the wheel body 1 and the insulating tube 213 and secured with the bolt 5. The two wires 23 and 24 of the coil 22 will engage with the bearings 13 on the wheel rims 11 and 12 to lead the positive and negative poles outwardly. Because the conductive washer 6 engages with one bearing 13, the electric power is transferred there through the shaft 4 to accelerate charging generator.

When the wheel body 1 rotates, the solar gear 31 and the coil 22 are both coupled on the wheel body 1 and will rotate in the same direction. The inner gear 312 of the solar gear 31 links the planetary gears 32 and the driven gear 34 to rotate simultaneously. The shaft sleeve 211 secured on the hole 341 of the driven gear 34 also links the magnet 21 to rotate with respect to the coil 22 in an opposite direction. Thus, when the wheel body 1 rotates, the coil 22 and the magnet 21 will rotate in opposite directions. This counter rotation increases charging efficiency of the generator unit 2. Further, the number of the teeth of the accelerating gear set 3 also affects the rotation of the generator unit 2.

The two wires 23 and 24 transfer the positive and the negative poles of the coil 22 to the bearings 13 of the wheel body 1. The bearing 13 engaging with the conductive washer 6 transfers the power through the shaft 4. This electric power transferred through the bearing 13 and the shaft 4 activates an illumination or sound device. With the accelerating gear set 3 of this design, even when the wheel body 1 is rotating at a slow speed, the generator unit 2 can still generate enough power to activate the illumination device.

I claim:

1. A wheel having an accelerating charger comprising a wheel body, a generator unit, an accelerating gear set, and a shaft, said wheel body comprising a pair of wheel rims, each wheel rim comprising a bearing at a center thereof and an insulating sleeve thereon, said generator unit comprising a magnet and a coil, said magnet being sleeved on a shaft sleeve, said shaft sleeve having an insulating tube therein, said insulating tube having cut-off surfaces at one end thereof, said coil protruding a pair of bosses outwardly to transfer electric power with two wires;

said accelerating gear set comprising a solar gear, a pair of planetary gears, a driven gear and a gear plate, said solar gear comprising a pair of lugs extending from an outer edge, and an inner gear around an inner wall of said solar gear and meshing with said planetary gears, said planetary gears being pivoted on said gear plate, said gear plate comprising a hole having two flat sides, said driven gear placed between said planetary gears meshing with said planetary gears, said shaft sleeve of said magnet being inserted through said driven gear, said magnet being linked with said driven gear to rotate;

said shaft being a conducting metal rod inserted in said wheel body;

said solar gear and said coil being coupled on said wheel body, said insulating tube of said generator unit being secured with said gear plate.

2. The wheel having an accelerating charger, as recited in claim 1, wherein said two wires of said coil are connected with said bearings of said wheel rims, respectively, and said shaft is sleeved with a conductive washer engaging with one of said bearings to transfer a positive pole and a negative pole through said shaft and one of said bearings, respectively.

* * * * *